Figure 1:
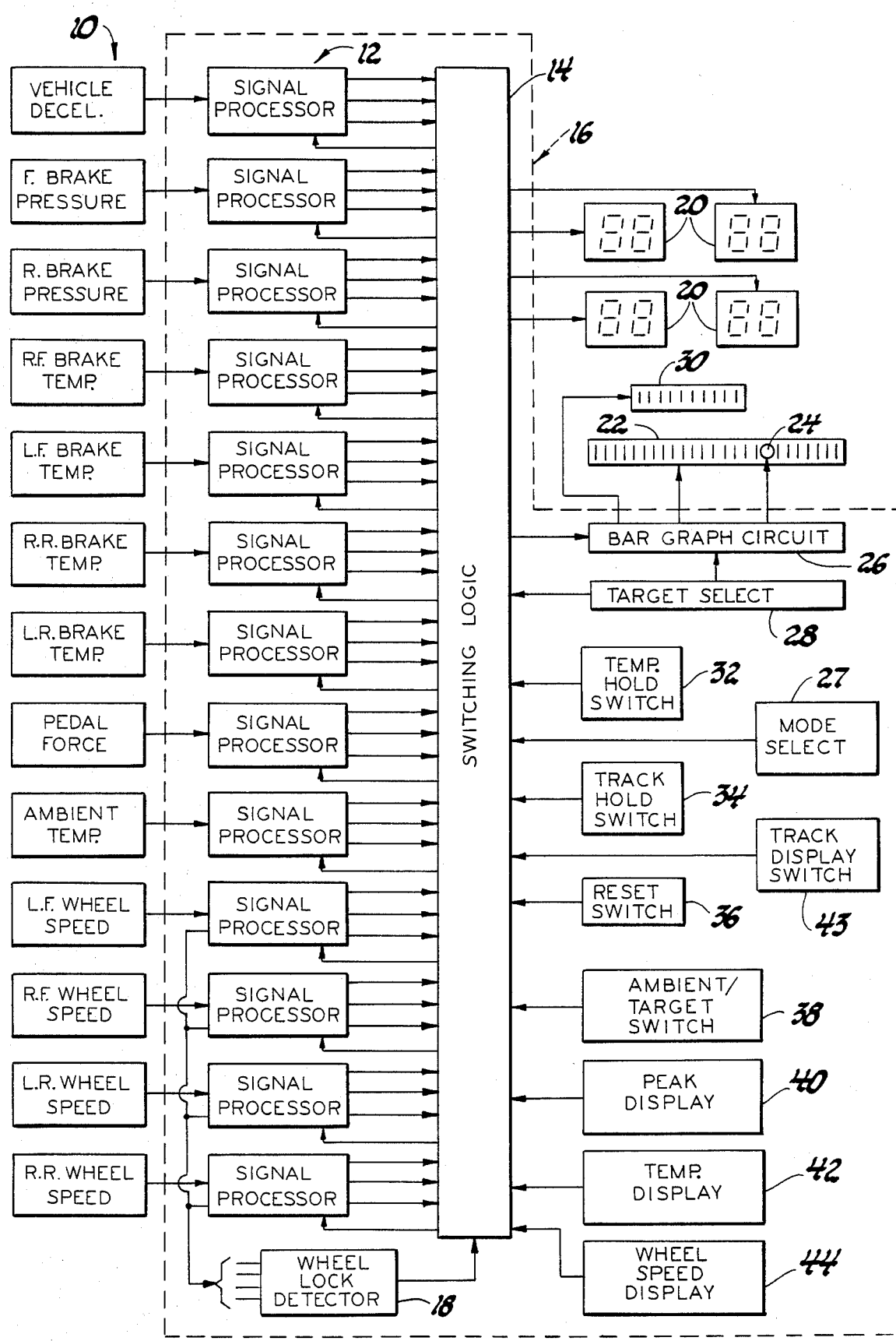

United States Patent [19]

Moore et al.

[11] Patent Number: 4,520,663
[45] Date of Patent: Jun. 4, 1985

[54] VEHICLE BRAKE TEST APPARATUS

[75] Inventors: George R. Moore, Englewood; Daniel H. Mahannah, Dayton, both of Ohio

[73] Assignee: General Motors Corporation, Detroit, Mich.

[21] Appl. No.: 563,219

[22] Filed: Dec. 19, 1983

[51] Int. Cl.³ .............................................. G01L 5/28
[52] U.S. Cl. .................................................... 73/129
[58] Field of Search ....................... 73/121, 128, 129; 340/52 A, 52 B, 52 C

[56] References Cited

U.S. PATENT DOCUMENTS 3,998,093 12/1976 Bertolasi ............................... 73/112
4,085,979 4/1978 Leiber et al. ....................... 340/52 B
4,295,136 10/1981 Stoutenburg ......................... 340/753

Primary Examiner—Jerry W. Myracle
Attorney, Agent, or Firm—Warren D. Hill

[57] ABSTRACT

For road testing vehicle brakes the vehicle is equipped with transducers for measuring wheel speeds and temperatures, vehicle deceleration, brake line pressures, etc. A control circuit processes the transducer signals and supplies output signals proportional to the measured parameters as well as peak values generated during a brake test and hold values stored upon manual command. These various parameter values are displayed through a switching circuit on four numeric displays in view of the operator and a special bar graph display selectively displays parameters of prime interest to the operator such as front brake pressure or vehicle deceleration to produce a single blinking light when a selected target value is obtained and illuminates successive LED's in a lineal array each representing an increment of deviation from the target value so that the error appears in bar graph form for easy assimilation by the operator during the road test.

5 Claims, 6 Drawing Figures

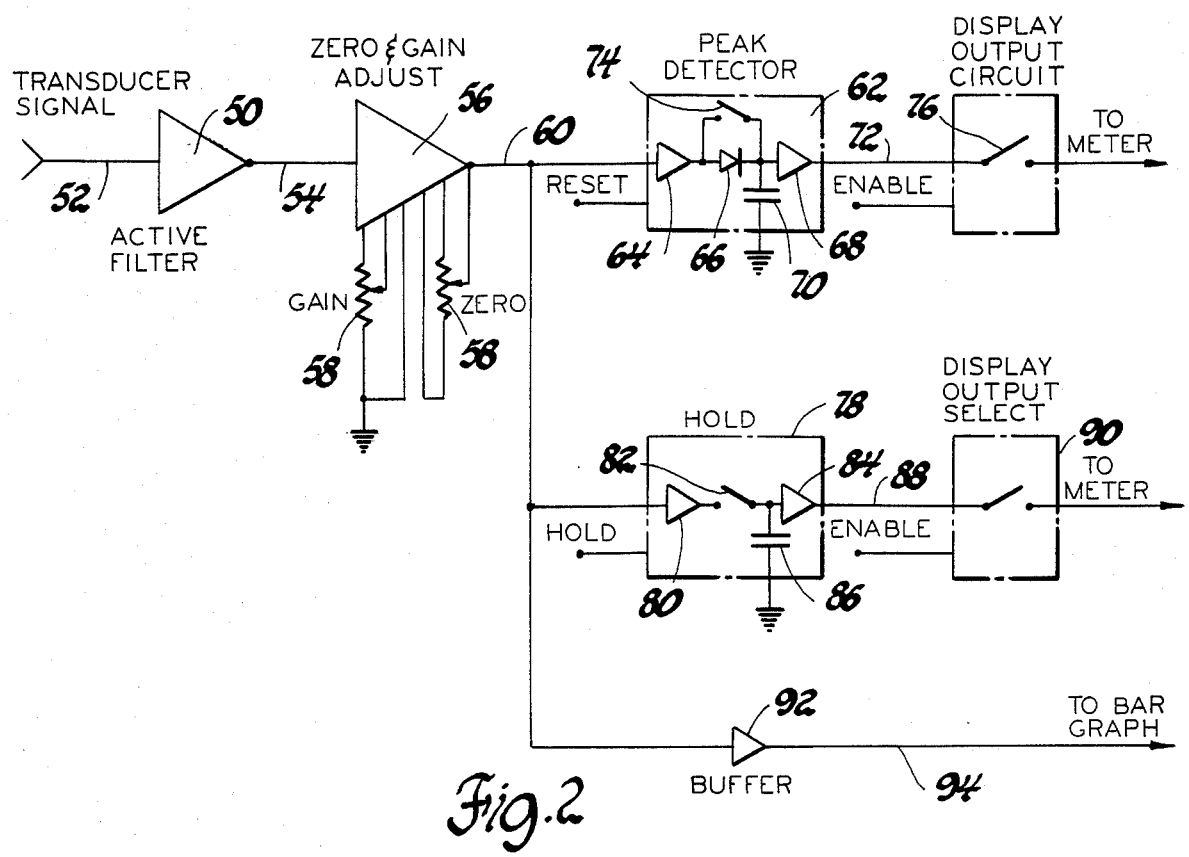
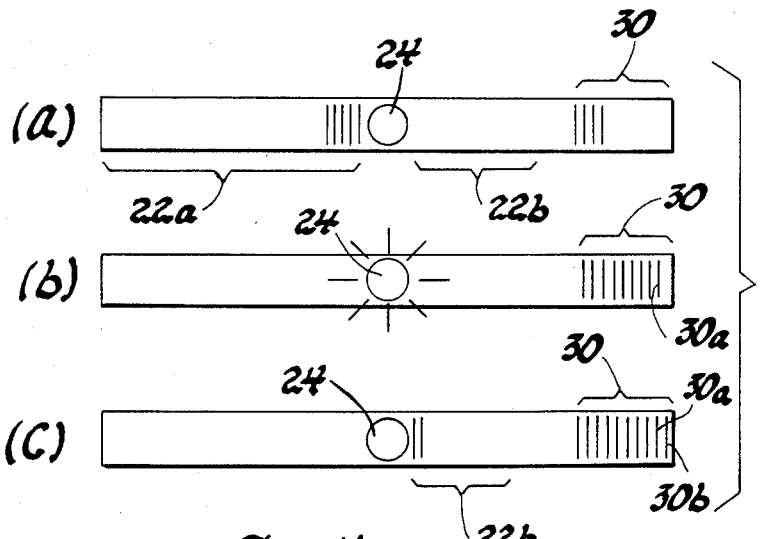

VEHICLE BRAKE TEST APPARATUS

This invention relates to apparatus for testing vehicle brakes and more particularly to a brake test circuit for monitoring brake test parameters and displaying their values.

In road testing vehicle brakes it is desired to make runs under prescribed conditions where the brakes are applied to obtain a desired vehicle deceleration or a desired brake line pressure and to monitor various parameters during and immediately after the run. To carry out those procedures it has been the practice to equip the vehicle with gauges displaying all the test parameters so that the vehicle operator had to watch a dial while applying the brakes to determine when the proper degree of braking has been obtained and then the operator or an assistant had to record or remember the values of several parameters at some particular point in the run for later recording. The required instrumentation was very bulky and difficult to apply to a test vehicle. Moreover, since the readings had to be recorded manually and while the data was changing, inaccuracies in the data could occur. In addition this operation tended to distract the vehicle operator. Some advantages of that system however are that data is available to the operator in real time so that any errors in test procedures may be recognized immediately to allow a timely test re-run.

It is therefore an object of the invention to provide brake test instrumentation which is compact and which offers maximum information to the operator with minimal attention to the equipment being required by the operator. It is another object to provide such instrumentation wherein test parameters are stored on command for later observation or recording. A further object of the invention is to collect and present the values of key parameters to the operator in a manner that is most useful to enable the operator to perform the test accurately.

The invention is carried out by brake test instrumentation having transducers for all the parameters to be measured, a controller for processing the signals from the transducers and indicating by a single light when a given parameter has reached a target value and displaying in bar graph form deviations in either direction of the parameter from the target value for easy assimilation by the operator. The invention further comprehends a display having fewer indicators than the number of sensed parameters and circuitry for selectively displaying values of certain of the parameters at a given time upon manual command.

Figure 3:
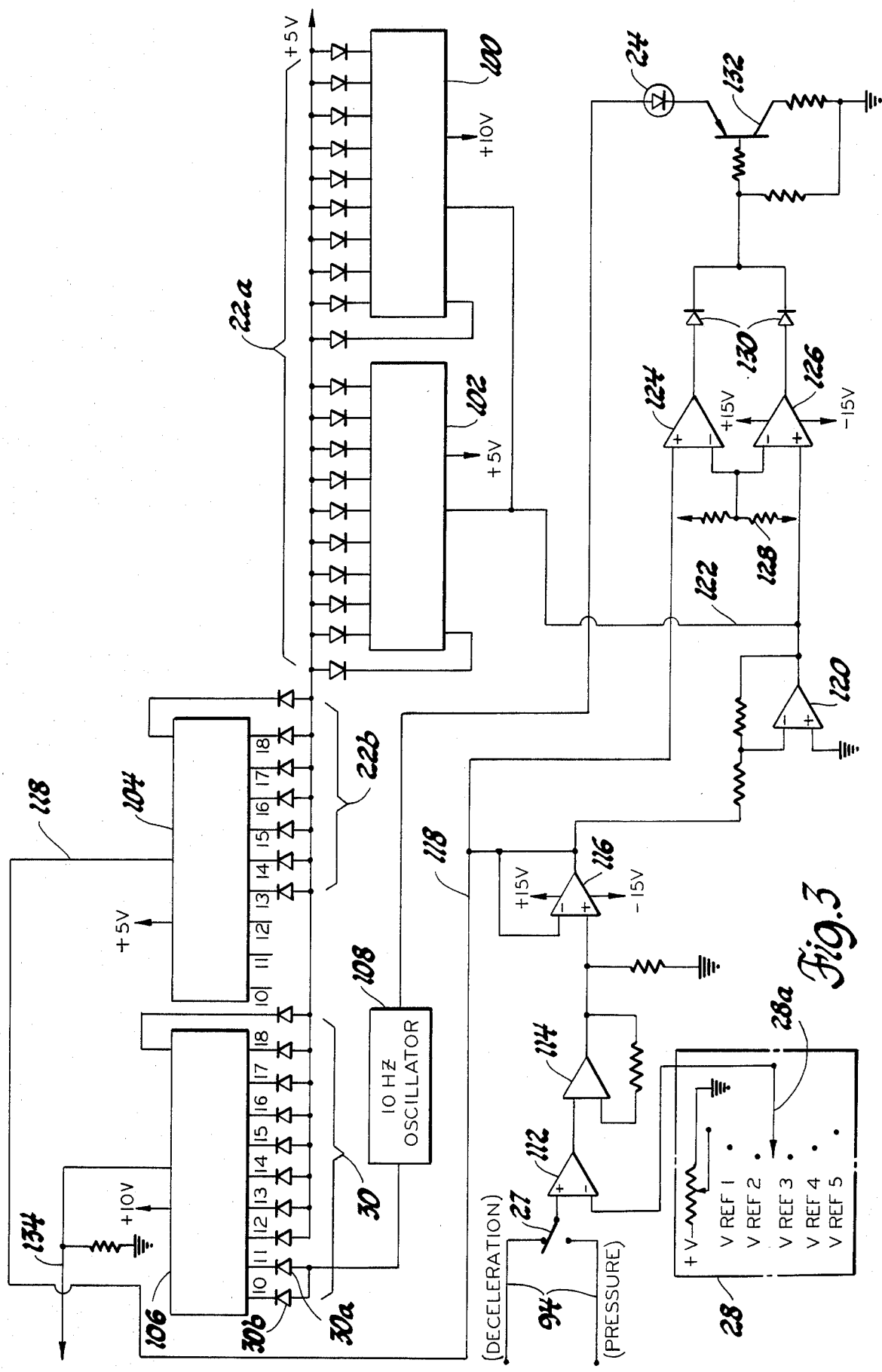

The above and other advantages will become more apparent from the following description taken in conjunction with the accompanying drawings wherein:

FIG. 1 is a block diagram of the brake test instrumentation system according to the invention, FIG. 2 is a more detailed circuit diagram of a typical signal processor circuit of FIG. 1, FIG. 3 is the display circuitry for the bar graph display of FIG. 1, FIGS. 4a, b and c are illustrations of the bar graph display appearance for undershoot, on-target and overshoot conditions respectively.

Referring to FIG. 1, a plurality of transducers 10 of conventional types measure several vehicle and braking system parameters which are particularly pertinent in evaluating braking performance. As shown in the drawing, these parameters are vehicle deceleration, front and rear brake pressure, the temperature of each brake lining, pedal force, ambient temperature and each wheel speed. Each transducer has its output connected to a signal processor 12 which in turn has multiple outputs connected to switching logic 14. The several signal processor circuits 12 and the switching logic 14 together comprise a control circuit 16. The control circuit 16 also includes a wheel lock detector 18 which samples each wheel speed and determines on the basis of a predetermined relationship when a wheel lock occurs and signals the switching logic. Thus, operator controlled parameters (also called "track values") such as pedal force, line pressure, and deceleration as well as performance parameters such as temperature and wheel speed are monitored. Four liquid crystal numeric displays 20 are selectively connected by the switching logic to selected signal processor outputs to display the values of parameters as requested by switch inputs. A bar graph display 22 and a target lamp 24 controlled by bar graph circuit 26 is connected by the switching logic to the signals representing front brake pressure or vehicle deceleration as determined by a mode select switch 27 so that the deviation of either of those values from the target value is displayed in bar graph fashion. The target value is selected by target circuit 28. Another bar graph display 30 which may be contiguous with the bar graph display 22 is controlled by the bar graph circuit and switching logic to display pedal force. In addition to the mode select switch 27 and the target select circuit 28, the inputs to the control circuit are a temperature hold switch 32, a track hold switch 34, a reset switch 36, an ambient/target switch 38, a peak display switch 40, a temperature display switch 42, a track display switch 43 and a wheel speed display switch 44. Each of the switches addresses the switching logic in a manner to carry out the commanded function. Thus the temperature hold switch operation causes the hold circuit of the signal processor 12 for each brake temperature to store the instantaneous temperature at the time of switch operation. The track switch 43 causes the display of traditional "track" values comprising front and rear brake line pressure, vehicle deceleration and pedal force and the track hold switch 34 causes the appropriate circuits to hold the track values. The reset switch when operated disables the hold functions and causes these measured variables to be transmitted in real time. The ambient/target switch 38 causes display of the ambient temperature of the atmosphere and the target value selected by the circuit 28. The peak display switch 40 causes display of the peak track values which occur during a run. A temperature display switch 42 causes the four brake temperatures (either real time or "hold" values) to be displayed on the meters 20 while the wheel speed display 44 causes display on indicators 20 of the values of wheel speed or if wheel lock has occurred, the values which were stored at the time of wheel lock detection.

The signal processor circuit 12 associated with each transducer is generally similar to the others although there are specific differences which are appropriate to obvious requirements of each particular transducer or display needs for that information. A typical signal processor circuit 12 is shown in FIG. 2 and comprises an active filter 50 supplied by a line 52 from a transducer and having an output on line 54 to a zero and gain adjust amplifier 56 with variable resistance 58 for making the desired adjustments. The adjusted output on line 60 is applied to a peak detector circuit 62 which comprises a buffer amplifier 64, a diode 66 and buffer amplifier 68 in series, with the cathode of the diode connected through a large capacitor 70 to ground. The maximum signal applied by line 60 to the peak detector will be stored on the capacitor 70 and applied to the line 72. A normally open switch 74 across the diode 66 is responsive to a reset signal to return the voltage of the capacitor 70 to the output level of the amplifier 64. The line 72 is applied to a normally open switch 76 which, when enabled by an appropriate signal from the switching logic circuit, connects the line 72 to one of the displays 20. The line 60 is also connected to a hold circuit 78 which comprises a buffer amplifier 80, a normally closed switch 82 in series with an amplifier 84, and a large storage capacitor 86 between the input of amplifier 84 and ground. Normally the hold circuit 78 transfers the signal on line 60 to the line 88 but when the hold input line is actuated the switch 82 is opened to store the voltage present at that time on the capacitor 86 which is the value on line 88. That value will be held until the hold switch 82 is closed upon reset action of the switching logic. A display select switch 90 when closed due to actuation of its enable line by the switching logic couples the line 88 to a meter 20. Thus, before the hold switch 82 is opened, the meter may display the running value of the measured parameter but after the hold switch 82 is opened only the stored value will be available for display. The line 60 is also coupled through a buffer amplifier 92 to an output line 94 which leads to the bar graph circuit, a recorder or elsewhere as desired. In the case of vehicle deceleration, brake pressure and pedal force, the line 94 would connect to the bar graph circuit. The circuit of FIG. 2 represents a signal processor circuit for line pressure, pedal force and vehicle deceleration, while the wheel skid and temperature signal processor circuits have only the hold function since the peak circuit is not required. The ambient temperature circuit requires neither the peak function nor the hold function.

FIG. 3 illustrates the bar graph circuit 26 which controls the line displays 22 and 30 as well as the target lamp 24. A lineal array 22a of LED's, preferably 20 in number, are connected by their anodes to a five volt power supply and their cathodes are connected to bar display drivers 100 and 102, each driver accommodating ten of the LED's. A second lineal array of LED's 22b, preferably aligned with the array 22a, is connected between the five volt supply and a bar display driver 104. As shown in FIG. 4, the bar graph display includes the target lamp 24 centrally located and the display with the LED array 22a on the left side of the target lamp and the LED array 22b on the right side of the target lamp. The large number of lamps 22a are used to indicate the amount of undershoot of the controlled parameter, i.e., brake pressure, or vehicle deceleration and the array 22b will indicate the amount of overshoot of the parameter. Only a few lamps, say 7, are required in the array 22b since overshoot is not likely to become large and is easy to control. A final array 30 of LED's aligned with the arrays 22a and 22b and set apart slightly from the array 22b comprises ten LED's which indicate in bar graph form the pedal force with the maximum desired value being indicated by flashing illumination of the penultimate lamp 30a and force exceeding the maximum being indicated by flashing of the end lamp 30b. As indicated in FIG. 3, the first 8 LED's of the array 30 are connected between the five volt source and a bar display driver 106 with the last two LED's 30a and 30b being connected between a 10 Hz oscillator 108 and the bar graph driver 106. The bar graph drivers 100 through 106 are commercially available integrated circuits such as the National Semiconductor LM3914. Such bar graph drivers divide a reference voltage into 10 parts to provide a different reference voltage for each LED and compares that reference voltage with an input signal to determine which LED's of an array to illuminate. The bar graph drivers 102 and 104 are each supplied with a reference voltage of 5 volts while the bar graph drivers 100 and 106 are supplied with ten volts for the referenced voltage.

The signal inputs to the display are the output lines 94 from the signal processor circuits for deceleration and front brake line pressure respectively. The mode switch 27 selectively connects either of the lines 94 to a summing amplifier 112 that is connected to the target select circuit 28 which contains a manually controlled selector switch 28a for selecting any of several reference voltages each of which corresponds to some target deceleration or line pressure. Preferred deceleration targets are 8, 10, 12, 15 and 20 ft/sec/sec. The preferred line pressure target is 200 psi. An adjustable target value is also available.

The selected signal then is supplied to the summing amplifier 112 to provide an offset such that when the signal on line 94 equals the reference voltage the summer output will be zero and whenever the line 94 voltage deviates from that reference voltage the summer output will be proportional to the deviation and have a negative value for values below the reference and positive values for line 94 values higher than the reference voltage. The output of the summing amplifier 112 is supplied to a range adjust amplifier 114 which causes an output of ±10 volts full scale over the desired display range. The output of the amplifier 114 is supplied to the input of the buffer amplifier 116 having an output on line 118 which is connected to the signal input of the bar graph driver 104. That output line is also connected to an inverter 120 which has its output 122 in turn connected to the bar graph drivers 100 and 102. A window comparator comprising amplifiers 124 and 126 has a low reference voltage supplied by a voltage divider 128 connected to the negative input terminals thereof while the lines 118 and 122 are connected to the positive terminals. The amplifiers 124, 126 have their outputs connected through diodes 130 to the base of a PNP transistor 132. The emitter is connected through the LED 24 serving as the target lamp to the 10 Hz oscillator 108. The collector and base are connected through appropriate resistors to ground so that normally the transistor is conducting and the lamp 24 flashes on and off. When either of the amplifiers 124 or 126 of the window comparator conduct, the transistor 132 and the lamp 24 will be turned off. This occurs when either the signal voltage on line 118 or the inverted voltage on line 122 exceeds the low reference of the potentiometer 128. In the case of vehicle deceleration the signal on line 118 is scaled at one foot per second per second for each volt. It is preferred then that the potentiometer 128 provide a potential of 0.25 volts to each amplifier 124 or 126 so that the lamp 24 will be energized when the vehicle deceleration is within ¼ foot per second per second of the selected target value. By virtue of the reference voltages applied to the bar graph drivers 100, 102 and 104 the individual LED's are illuminated in increments of ½ volt of increasing voltage; thus when the lamp 24 is energized indicating a null, as shown in FIG. 4b, none of the LED's in the arrays 22*a* and 22*b* are illuminated. If, however, there is a line 118 signal of say −2.6 volts then line 122 will carry a +2.6 volts to cause the illumination of the first 5 LED's of the display 22*a* to give the indication shown in FIG. 4*a* which represents a certain level of deceleration, viz., 2.5 ft per second per second less than the target value. If, as shown in FIG. 4*c*, the vehicle deceleration is one foot per second per second greater than the target value, the signal on line 118 will be one volt and the first 2 diodes of the array 22*b* will be illuminated thereby indicating the direction and amount of overshoot. When the target value is greater than 10 ft/sec/sec, all the LED's in the array 22*a* will be illuminated at zero deceleration and will be sequentially turned off starting at the left (as seen in FIG. 4) when the deviation from the target value decreases below 10 ft/sec/sec. The display operation is the same when operating to indicate the deviation of line pressure from a target value.

The LED array 30 responds to a signal on the line 134 which represents pedal force. The signal is scaled by circuitry, not shown, to provide illumination of all ten lamps when the pedal force exceeds the desired maximum value which may be, e.g., 150 pounds as shown in FIG. 4*c* and provides for illuminating the LED 30*a* as well as the lower order LED's as shown in FIG. 4*b* when the pedal force is substantially at the maximum value as shown in FIG. 4*b*. A corresponding small number of illuminated LED's in the array 30 as shown in FIG. 4*a*, represents a low pedal force. Thus the display of pedal force in bar graph form is a conventional bar graph indicator except for the provision of blinking lamps 30*a* and 30*b* at the maximum and over-maximum values.

The bar graph display as described above readily conforms to a compact low profile module for mounting above or adjacent the vehicle instrument panel for convenient observation by the vehicle operator while driving. The operator while watching the bar graph display out of the corner of his eye can accurately control the braking operation to obtain the desired pressure or deceleration without distraction. Simultaneously, the observation of the limiting pedal force display can be made.

During use of the equipment for road testing of vehicle brakes the vehicle operator or an assistant will operate the mode select switch 27 to display either brake pressure or vehicle deceleration on the bar graph display and may then operate the ambient/target switch 38 which causes display of the ambient temperature and the selected target value. Those values are manually entered in a permanent record then, depending on the emphasis of a particular test being conducted, the track switch, the temperature display switch 42 or the wheel speed display switch 44 may be actuated to cause the instantaneous values of those associated parameters to be displayed during the test. As the road test proceeds, the brakes are applied by the operator according to a predetermined schedule and the bar graph display accurately and conveniently shows the degree of braking taking place. At any desired time during the procedure (usually when the target value is attained) the track hold switch 34 is operated to hold the values of deceleration, brake pressures and pedal force. In the event that wheel lock occurs the detector 18 will cause the wheel speeds to be held at the instant of wheel lock. The temperature hold switch 32 will be operated as required to cause the brake lining temperatures at that time to be stored. Then at the end of the test the various held values as well as the peak values can be called selectively to the indicators 20 for permanent recording.

By way of example, a typical mountain descent brake test is conducted as follows:

The test is divided into a series of segments, each comprising braking at a controlled speed (20 to 25 mph) for a distance of one mile, operating the temperature hold switch 32, and then braking to a target deceleration. When the target deceleration is attained the track hold switch 34 is actuated so that the data is held in memory for later recording without distracting the vehicle operator. Then without coming to a full stop the procedure is repeated for the next segment. The hold values and peak values are selectively displayed and recorded, preferably by an assistant, during the initial portion of the next segment, and the reset switch is operated to clear the circuits for new data.

It will thus be seen that the brake test apparatus according to this invention provides a versatile, lightweight and compact system for monitoring the test parameters during vehicle braking tests and features exceptionally readable displays of controllable parameters which allow the vehicle operator to be kept apprised of the vehicle and brake system operation for accurate test performance.

The embodiments of the invention in which an exclusive property or privilege is claimed are defined as follows:

1. Vehicle brake test instrumentation for monitoring operation and performance parameters of a brake system while under control of a vehicle operator comprising transducers coupled to the vehicle and the brake system for sensing values of parameters, display means including a target lamp and a line of lamps adjacent thereto, control means for processing information sensed by the transducers and controlling the display means, the control means including means for establishing a desired value of an operator controlled parameter and means for illuminating only the target lamp when the controlled parameter is substantially at the desired value and for illuminating a successive one of the line of lamps for each increment of deviation of the actual parameter value from the desired value whereby the line of lamps indicates in bar graph form the instantaneous amount of deviation from the desired value so that the operator can readily view and interpret the information while trying to attain the desired value.

2. Vehicle brake test instrumentation for monitoring operation and performance parameters of a brake system while under control of a vehicle operator comprising transducers coupled to the vehicle and the brake system for sensing values of parameters, display means including a target lamp and first and second lines of lamps adjacent thereto, control means for processing information sensed by the transducers and controlling the display means, the control means including means for manually selecting a desired value of an operator controlled parameter and means for periodically illuminating only the target lamp when the controlled parameter is substantially at the desired value and for illuminating a successive one of the first line of lamps for each increment of deviation of the actual parameter value below the desired value and illuminating a successive one of the second line of lamps for each increment of deviation of the actual parameter value above the desired value whereby the lines of lamps indicate in bar graph form the instantaneous amount and direction deviation from the desired value so that the operator can readily view and interpret the information while trying to attain the desired value.

3. Vehicle brake test instrumentation for monitoring operation and performance parameters of a brake system while under control of a vehicle operator comprising transducers coupled to the vehicle and the brake system for sensing values of parameters, display means including a target lamp and a line of lamps adjacent thereto, control means for processing information sensed by the transducers and controlling the display means in response to at least one selected parameter, the control means including means for manually selecting a desired value of an operator controlled parameter and means for illuminating only the target lamp when the controlled parameter is substantially at the desired value and for illuminating a successive one of the line of lamps for each increment of deviation of the actual parameter value from the desired value whereby the lines of lamps indicates in bar graph form the instantaneous amount of deviation from the desired value so that the operator can readily view and interpret the information while trying to attain the desired value.

4. Vehicle brake test instrumentation for monitoring operation and performance parameters of a brake system while under control of a vehicle operator comprising transducers coupled to the vehicle and the brake system for sensing values of parameters including vehicle deceleration, display means including a target lamp and a line of lamps adjacent thereto, control means for processing information sensed by the transducers and selectively coupling the information to the display means, the control means including means for manually selecting a desired value of vehicle deceleration and means for illuminating only the target lamp when the deceleration is substantially at the desired value and for illuminating a successive one of the line of lamps for each increment of deviation of the actual deceleration above or below the desired value whereby the line of lamps indicates in bar graph form the instantaneous amount of deviation from the desired value so that the operator can readily view and interpret the information while operating the brakes to attain the desired deceleration.

5. Vehicle brake test instrumentation for monitoring operation and performance parameters of a brake system while under control of a vehicle operator comprising transducers coupled to the vehicle and the brake system for sensing values of parameters, display means including indicators fewer in number than the sensed parameters and further including a target lamp and a line of lamps adjacent thereto, control means for processing information sensed by the transducers and in response to manual selection coupling information to the indicators to display the value of selected parameters, the control means having a manually operable hold switch and hold circuits associated with the transducer for storing the parameter values at the time of hold switch actuation for display on the indicators at a later time, the control means including means for establishing a desired value of an operator controlled parameter and means for flashing the target lamp when the controlled parameter is substantially at the desired value and for illuminating a successive one of the line of lamps for each increment of deviation of the actual parameter value from the desired value whereby the line of lamps indicates in bar graph form the instantaneous amount of deviation from the desired value so that the operator can readily view and interpret the information while trying to attain the desired value.

* * * * *